United States Patent [19]

Quentin

[11] Patent Number: 4,950,730
[45] Date of Patent: Aug. 21, 1990

[54] MOLDABLE/EXTRUDABLE THERMOTROPIC AROMATIC COPOLYESTERAMIDES

[75] Inventor: Jean-Pierre Quentin, Lyon, France
[73] Assignee: Rhone-Poulenc Chimie, France
[21] Appl. No.: 360,280
[22] Filed: Jun. 2, 1989

Related U.S. Application Data

[63] Continuation of Ser. No. 217,352, Jul. 11, 1988, abandoned.

[30] Foreign Application Priority Data

Jul. 10, 1987 [FR] France .................. 87 10179

[51] Int. Cl.$^5$ .................. C08G 63/02; C08G 63/18
[52] U.S. Cl. .................. 528/184; 528/176; 528/191; 528/193; 528/194
[58] Field of Search .............. 528/176, 184, 191, 193, 528/194

[56] References Cited

U.S. PATENT DOCUMENTS

| | | | |
|---|---|---|---|
| 3,598,864 | 8/1971 | Caldwell et al. | 528/184 |
| 4,499,256 | 2/1985 | Blundell et al. | 528/172 |
| 4,727,131 | 2/1988 | Kock et al. | 528/176 |
| 4,764,582 | 8/1988 | Hisgen et al. | 528/184 |

Primary Examiner—Harold D. Anderson
Assistant Examiner—T. Mosley
Attorney, Agent, or Firm—Sherman and Shalloway

[57] ABSTRACT

High molecular weight thermotropic aromatic copolyesteramides which can be molded/extruded into a wide variety of useful shaped articles having improved thermomechanical properties are comprised of recurring structural units of the formulae (I), (III) and (IV), and optionally (II), wherein:
(I) represents the structure:

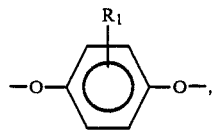

in which $R_1$ is a methyl or ethyl radical or a chlorine or bromine atom, with the proviso that the units (I) may be identical or different.

15 Claims, No Drawings

MOLDABLE/EXTRUDABLE THERMOTROPIC AROMATIC COPOLYESTERAMIDES

This application is a continuation of application Ser. No. 217,352, filed July 11, 1988.

CROSS-REFERENCE TO COMPANION APPLICATIONS

My copending applications, Ser. No. 129,289, filed Dec. 7, 1987, and Ser. No. 217,353 and Ser. No. 217,350, both filed concurrently herewith and all assigned to the assignee hereof.

BACKGROUND OF THE INVENTION

1. Field of the Invention:

The present invention relates to novel moldable/extrudable thermotropic aromatic copolyesteramides and to the preparation thereof from at least one substituted hydroquinone (or an ester/amide-forming derivative thereof), from a mixture of aromatic dicarboxylic acids (or ester/amide-forming derivatives thereof) and from at least one aromatic carboxylic amino acid (or ester/amide-forming derivative thereof).

2. Description of the Prior Art:

Thermotropic polyesters prepared from one or more diphenols and one or more aromatic and/or cycloaliphatic dicarboxylic acids are known to this art. Polyesters of this type are described, for example, in U.S. Pat. No. 3,991,013. Among the polyesters described therein, those produced from a substituted hydroquinone (or ester-forming derivative thereof), terephthalic acid (or ester-forming derivative thereof) and from 1,2-bis(-paracarboxyphenoxy)ethane (or ester-forming derivative thereof) are particularly valuable polymers.

SUMMARY OF THE INVENTION

A major object of the present invention is the provision of novel thermotropic polyesters which can be prepared more economically than the aforenoted copolyesters known to the art, by employing the substituted hydroquinone (or ester/amide-forming derivative thereof) and such bis(para-carboxyphenoxy)alkane (or ester/amide-forming derivative thereof), which are costly reactants, in lower concentrations in the starting reactant mixture and adding thereto a suitable supplementary reactant which is less costly and which is readily available on an industrial scale.

Another object of this invention is the provision of novel thermotropic aromatic copolyesteramides which have improved thermomechanical properties vis-a-vis the known copolyesters discussed above, especially as regards maintaining the values of the torsional moduli as a function of temperature.

It has now unexpectedly been found that such objectives may be attained by the use of the additional reactant para-aminobenzoic acid or an ester/amide-forming derivative thereof.

Briefly, the present invention features novel moldable/extrudable thermotropic aromatic copolyesteramides comprising recurring units of the formulae (I), optionally (II), (III) and (IV), wherein:

(I) represents the structure:

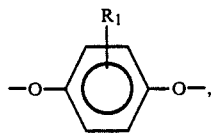

in which $R_1$ is a methyl or ethyl radical or a chlorine or bromine atom, with the proviso that the units (I) may be identical or different, (II) represents the structure:

(III) represents the structure:

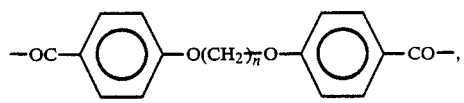

in which n is an integer ranging from 2 to 6, with the proviso that the units (III) may be identical or different, (IV) represents the structure:

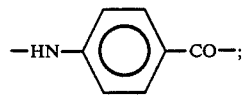

the molar ratio of the units (I) relative to the sum of the units (II)+(III) ranges from 0.95 to 1.05;

the amount of the units (II) in the mixture of (II)+(III) ranges from 0 to 80 mol % and that of the units (III), on the same basis, ranges from 100 to 20 mol %;

the amount of the units (IV), expressed relative to the amount of the units (I) ranges from 5 to 100 mol %; and said copolyesteramides have a flow temperature ranging from 200° to 350° C.

DETAILED DESCRIPTION OF THE PREFERRED EMBODIMENTS OF THE INVENTION

More particularly according to the present invention, the recurring structural units of the formula (I) are provided by a hydroquinone which is monosubstituted (by a methyl or ethyl radical or by a chlorine or bromine atom) or by a diester thereof. It should be appreciated that the units (I) may also be provided by a mixture of two or more monosubstituted hydroquinones or diesters thereof envisaged by the present invention.

The recurring structural units of the formula (11) are provided by a terephthalic acid or by an ester/amide-forming derivative thereof, such as, for example, a dihalide or a diester.

The recurring structural units of the formula (III) are provided by dicarboxylic acid of the formula:

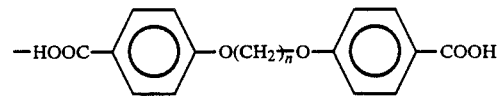

in which is as defined above, or from an ester/amide-forming derivative thereof, such as, for example, a dihalide or a diester. It should be appreciated that the units (III) may also be provided by a mixture of two or of more than two dicarboxylic acids or ester/amide-forming derivatives thereof. Exemplary dicarboxylic acids thus intended are 1,2-bis(para-carboxyphenoxy)ethane, 1,3-bis(paracarboxyphenoxy)propane, 1,4-bis(para-carboxyphenoxy)butane, 1,5-bis(para-carboxyphenoxy)pentane and 1,6-bis(paracarboxyphenoxy)hexane, and mixtures thereof.

The recurring structural units of the formula (IV) are provided by para-aminobenzoic acid or an ester/amide-forming derivative thereof, such as, for example, the compound obtained by acylation of the amine group or the compound obtained by esterification of the acid group or a halide of the acid group.

In a preferred embodiment of the invention, the copolyesteramides have the formula given above, in which:

the amount of the units (II) in the mixture of (II)+(III) ranges from 20 to 80 mol % and that of the units (III), on the same basis, ranges from 80% to 20 mol %; and the amount of the units (IV), expressed relative to the amount of the units (I), ranges from 10 to 70 mol %.

Among the aromatic copolyesteramides of this preferred group, those which are most particularly preferred are the polymers having a structural formula in which:

the units (I) are identical to each other, with the substituent $R_1$ being a methyl radical or a chlorine atom; such units (I) are provided by methylhydroquinone or chlorohydroquinone, or by the diesters thereof; and the units (III) are identical to each other, with the symbol n representing a number equal to 2, 3 or 4; such units are provided by 1,2-bis(para-carboxyphenoxy)ethane, by 1,3-bis(para-carboxyphenoxy)propane or by 1,4-bis(paracarboxyphenoxy)butane or by the ester/amide-forming derivatives thereof.

The copolyesteramides according to the invention have a molecular weight which is sufficiently high to permit them to be shaped by any known process, such as molding, spinning and conversion into film. In the case of soluble copolyesteramides, these have an inherent viscosity of at least 0.5 dl g$^{-1}$, preferably ranging from 0.5 to 4.0 dl g$^{-1}$; this inherent viscosity is measured at 25° C. on a solution containing 0.5 g of soluble copolyesteramide per 100 cm$^3$ of a para-chlorophenol/1,2-dichloroethane solvent mixture (50/50 by volume).

As regards the flow temperature, this preferably ranges from 260° to 330° C. By "flow temperature" is intended the temperature at which the edges of a flake-shaped sample of polymer or of a cut fiber begin to become rounded. This temperature is determined by observing the sample visually on a cover glass at a suitable rate of temperature increase, generally on the order of 10° to 20° C. per minute, such observation being carried out using a microscope equipped with a heater stage, commercially available under the trademark Thermopan.

The copolyesteramides according to the present invention also include polymers whose structural formulae may additionally contain aromatic recurring units providing ester and amide groups (dioxy units and/or dicarbonyl units and/or mixed secondary amino/carbonyl units) which have a structure other than of the units (I), (II), (III) and (Iv), the total amount of these additional units being not more than 10 mol % relative to the amount of the units (I). Exemplary of such additional recurring units are those of the formulae:

and/or

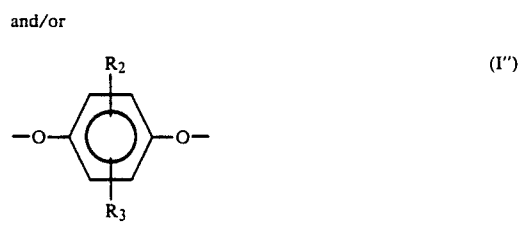

in which $R_2$ and $R_3$, which may be identical or different, each have the definition given above for $R_1$, with the promise that the units (I") may also be identical or different,

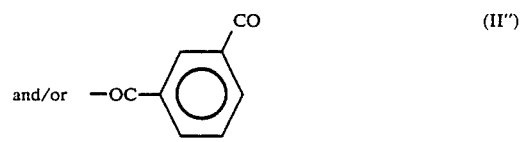

and/or

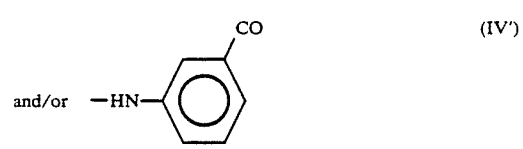

The recurring structural units of the formula (I') are provided by unsubstituted hydroquinone or a diester thereof.

The recurring structural units of the formula (I") are provided by a disubstituted hydroquinone or by a diester thereof or by a mixture of disubstituted hydroquinones or diesters thereof.

The recurring structural units of the formula (II') are provided by isophthalic acid or ester/amide-forming derivative thereof, such as, for example, a dihalide or a diester.

The recurring structural units of the formula (IV') are provided by meta-aminobenzoic acid or ester/amide-forming derivative thereof.

It will be appreciated that the total amount of all the dioxy recurring units and of all the dicarbonyl recurring units which are then present in the copolyesteramide will need to be such that the molar ratio of all the dioxy units relative to the sum of all the dioxy units + all the dicarbonyl units ranges from 0.95 to 1.05.

The copolyesteramides according to the present invention exhibit the major characteristic of being thermotropic, namely, they are capable of forming anisotropic melts which are easy to shape by spinning, film-forming or molding. Thermotropy is easy to demonstrate when the polymer is observed in melt form in an optical system equipped with two crossed polarizers (90°); birefringence and transmission of polarized light through the crossed polarizers occur in the case of anisotropic specimens. The demonstration of anisotropy in the polyesteramides according to the present invention is carried out by the TOT thermooptical method described in French Patent No. 2,270,282.

Consequently, melts in an anisotropic state have a specific orientation and a relatively high degree of organization, which can also be demonstrated in shaped articles such as filaments, films and molded objects, thus providing (even in the crude state) improved properties such as modulus and tenacity (which are not usually found in isotropic raw materials).

It should be appreciated that these anisotropic melts have an anisotropy range extending over at least 30° C. By "anisotropy range" is intended the temperature interval beginning with the temperature at which the birefringence and the transmission of light through the two crossed polarizers appears and which is above this temperature, an interval which has a variable upper limit and in which the melt is anisotropic without any danger of decomposition of the copolyesteramide.

The copolyesteramides according to the present invention may be shaped using any known process such as molding, spinning or film-forming, etc., and, obviously, by carrying out each operation within the anisotropy range so as to produce articles which have satisfactory properties. The presence of the mixed secondary amino/carbonyl units (IV) in the structure of the copolyesters in accordance with the present invention enables the average price of the raw materials to be decreased and consequently the cost of production of shaped articles produced from these copolyesteramides to be minimized. Furthermore, for example in the case of molded articles, an appreciable improvement is observed in the values of certain mechanical properties, especially the values of flexural and torsional moduli and, in addition, a better retention of the mechanical properties as a function of temperature is also observed (when compared 5 with the shaped polymers devoid of such mixed recurring units).

The mechanical properties, particularly those of thin articles, can be further increased by a heat treatment at elevated temperature, below the melting temperature of the polymer.

Depending upon the particular application intended therefor, the copolyesteramides according to the invention may include additives such as, in particular, colorants, stabilizers against the effects of light, oxygen and heat, fillers or reinforcing fillers, and fireproofing agents.

The copolyesteramides in accordance with the present invention may be prepared by various known polymerization processes.

For example, they may be prepared by reacting:

(1) methyl- and/or ethyl- and/or chloro- and/or bromohydroquinone, optionally mixed with another (or other) diphenol(s) such as, for example, unsubstituted hydroquinone and/or one or more hydroquinone(s) disubstituted with the above-mentioned groups, with (2) optionally, a derivative of terephthalic acid, either alone or optionally mixed with a derivative of another aromatic dicarboxylic acid such as, for example, isophthalic acid, and with (3) a derivative (or several derivatives) of $\alpha,\omega$-bis(-para-carboxyphenoxy)alkane(s), and with (4) a derivative of para-aminobenzoic acid involving the acid group, either alone or optionally mixed with a derivative of the same type of another aromatic amino acid such as, for example, meta-aminobenzoic acid, the said acid derivative being either a halide such as, for example, a chloride, or an aryl ester such as, for example, a phenyl, tolyl or naphthyl ester (the said derivative obviously being a dihalide or a diester in the case of a dicarboxylic acid). 10. The reaction is generally carried out in the presence of a catalyst such as those described in Canadian Patent No. 735,543.

In this process, the reactants are employed in proportions such that:

(i) the molar ratio diphenol(s)/diacid derivatives ranges from 0.95 to 1.05;

(ii) the amount of terephthalic acid derivative in the mixture derived from terephthalic acid $+\alpha,\omega$-bis(-paracarboxyphenoxy)alkane derivative(s) ranges from 0 to 80 mol %, and preferably from 20 to 80 mol %;

(iii) the amount of para-aminobenzoic acid derivative ranges from 5 to 100 mol % relative to the amount of monosubstituted hydroquinone(s), and preferably from 10 to 70 mol %; and (iv) the total amount of the reactants employed, other than the monosubstituted hydroquinone(s), the terephthalic acid derivative, the $\alpha,\omega$-bis(paracarboxyphenoxy)alkane derivative(s) and the para-aminobenzoic acid derivative, does not exceed 10 mol % relative to the amount of monosubstituted hydroquinone(s).

The copolyesteramides produced according to this first process generally have end groups which are, on one end of the molecule, of the phenolic H and/or of the $NH_2$ H type and, on the other end of the molecule, of the halide or aryloxy type.

It is also possible to prepare the copolyesteramides according to the invention by direct esterification and amidification between the diphenol(s) envisaged, the aromatic dicarboxylic acids and the aromatic amino acid(s). The copolyesteramides thus obtained generally have end groups of the phenolic H type and/or of the $NH_2$ H and acidic OH type.

Preferably, however, a third process employing an acidolysis reaction is employed. In accordance with this preferred process:

(1) a diester of methyl- and/or ethyl- and/or chloro- and/or bromohydroquinone, optionally mixed with one or more diester of another (or other) diphenol(s) such as, for example, unsubstituted hydroquinone and/or one or more hydroquinone(s) disubstituted with the aforesaid groups, is reacted with (2) optionally, terephthalic acid, either alone or optionally mixed with another aromatic dicarboxylic acid such as, for example isophthalic acid, and with (3) one or more $\alpha,\omega$-bis(paracarboxyphenoxy)alkane(s), and with (4) a para-aminobenzoic acid derivative acylated on the amine group, either alone or optionally mixed with an acylated derivative of the same type of another aromatic amino acid such as, for example, meta-aminobenzoic acid, the said diphenol diester being prepared from an alkanoic acid containing from 2 to 6 carbon atoms such as, for example, an acetic ester and the said amino acid derivative acylated on the amine group being prepared from an anhydride or a halide such as, for example, a chloride derived from an alkanoic acid containing from 2 to 6 carbon atoms such as, for example, an acetylated derivative.

Here, too, the reaction is generally carried out in the presence of a catalyst such as, especially, sodium, magnesium, manganese and zinc acetate, butyl titanate and antimony trioxide. It generally begins at a temperature of from 260° C. to 310° C., and then the acid formed distills off. After approximately 80% of the acid theoretically to be distilled has been collected, the temperature is progressively increased to a value above the temperature selected for beginning the reaction and ranging from 280° C. to 330° C., while the pressure is progressively reduced. When the distillation of acid is complete, the polycondensation is continued under a high vacuum for a period of time which may range up to 30 minutes or more.

In this acidolysis process, the reactants are employed in proportions such that:

(i) the molar ratio diester(s) of diphenol(s)/total diacids ranges from 0.95 to 1.05;

(ii) the amount of terephthalic acid in the mixture of terephthalic acid+α,ω-bis(paracarboxyphenoxy)alkane(s) ranges from 0 to 80 mol %, and preferably from 20 to 80 mol %;

(iii) the amount of the para-aminobenzoic acid derivative acylated on the amine group ranges from 5 to 100 mol % relative to the amount of diester(s) of monosubstituted hydroquinone(s), and preferably from 10 to 70 mol %; and (iv) the total amount of the reactants employed, other than the diester(s) of monosubstituted hydroquinone(s), terephthalic acid, the α,ω-bis(para-carboxyphenoxy)alkane(s) and the acyl derivative of para-aminobenzoic acid, is not more than 10 mol % relative to the amount of diester(s) of monosubstituted hydroquinone(s).

The copolyesteramides obtained according to this third process generally have end groups which are, on one end of the molecule, of the alkoxy and/or acylamino type and, on the other end, of the acid OH type.

In order to further illustrate the present invention and the advantages thereof, the following specific examples are given, it being understood that same are intended only as illustrative and in nowise limitative.

In said examples to follow, a certain number of controls were carried out on the copolyesteramides obtained. The operating procedures and/or the standards according to which these controls were carried out are given below:

Torsional Modulus:

This was determined at various temperatures using an automatic torsional pendulum at a frequency on the order of 1 hertz according to the ISO Standard R 537 Method B, the test specimens being conditioned at an RH of 50 according to NF Standard T 51 014. The results are expressed in MPa.

Tensile test

The tensile strength and modulus were measured at 23° C. in accordance with the dumbbell-type test specimens with a width of 4 mm and a thickness of 2 mm, conditioned at an RH of 50. The results are expressed in MPa.

Flexural modulus

This determination was carried out at 23° C. in accordance with the NF Standard T 51 001 on 80×8×4 mm bar-type specimens, conditioned at an RH of 50. The results are expressed in MPa.

Charpy impact strength

This was carried out at 23° C. in accordance with the NF Standard T 51 035 on 60×10×4 mm bar-type test specimens incorporating U-shaped notches, conditioned at an RH of 50. The results are expressed in kJ/m$^2$.

EXAMPLE 1

The following reactants and catalyst were introduced into a stirred and heated polycondensation reactor equipped with a device for distillation and for purging with an inert gas:

(1) chlorohydroquinone diacetate: 45.70 g

[molar ratio (1)/(2)+(3)=1];

(2) terephthalic acid: 16.6 g

[50 mol % in the mixture of (2)+(3)];

(3) 1,2-bis(para-carboxyphenoxy)ethane: 30.2 g

[50 mol % in the mixture of (2)+(3)];

(4) para-acetamidobenzoic acid: 17.9 g

[50 mol % relative to (1)];

(5) magnesium acetate: 0.055 g

[500 ppm].

The reactor was purged with nitrogen and was then heated with a metal bath set at 280° C. Acetic acid began to distill after a few minutes, the first drop of acid which distilled over corresponding to time zero. After 141 minutes, 25 cm$^3$ of acetic acid (87.5% of theory) were collected. The temperature of the metal bath was then progressively increased to 320° C. in 40 minutes. Over the same time period, the pressure was reduced from 1,010×10$^2$ Pa to 13.3×10$^2$ Pa. Heating at 320° C. was continued for 4 minutes while the pressure was reduced to 0.39×10$^2$ Pa during the same time period. The total volume of acetic acid distilled was 28 cm$^3$ (i.e., 97.9% of theory).

The polymer obtained was white and fibrous in appearance. It had an inherent viscosity of 1.46 dl g$^{-1}$. The flow temperature was 290° C. The anisotropy region ranged from 300° C. to more than 360° C.

The results of tensile, flexural and impact measurements are reported in the Table below.

With regard to molded test specimens permitting the mechanical properties to be measured, these were prepared using a screw press known to the art under the trademark KAP. For this purpose, the copolyesteramide obtained was milled and was then dried at 150° C. for 4 hours and the granules formed were injection-molded under the following conditions:

(i) temperature of the melt vessel: 320° C.
(ii) mold temperature: 25° C.
(iii) injection pressure: 22.5 MPa.

EXAMPLE 2

The following materials were introduced into the same apparatus as that described in Example 1:

(1) chlorohydroquinone diacetate: 45.70 g

[molar ratio (1)/(2)+(3)=1];

(2) terephthalic acid: 19.92 g

[60 mol % in the mixture of (2)+(3)];

(3) 1,2-bis(para-carboxyphenoxy)ethane: 24.16 g

[40 mol % in the mixture of (2)+(3)];

(4) para-acetamidobenzoic acid: 14.32 g

[40 mol % relative to (1)];

(5) magnesium acetate: 0.052 g

[500 ppm].

The reaction was carried out as indicated in Example 1. A volume of 27 cm$^3$ of acetic acid was recovered (98.5% of theory). The polymer obtained was light grey and fibrous in appearance. It was insoluble in the solvent mixture employed for viscosity measurements. The flow temperature was 290° C. The anisotropy region ranged from 300° 1 C. to more than 350° C. The results of tensile, flexural and impact measurements are reported in the Table below.

EXAMPLE 3:

The following materials were introduced into the same apparatus as that described in Example 1:
(1) chlorohydroquinone diacetate: 45.70 g

[molar ratio (1)/(2)+(3)=1];

(2) terephthalic acid: 23.24 g

[70 mol % in the mixture of (2)+(3)];

(3) 1,2-bis(para-carboxyphenoxy)ethane: 18.12 g

[30 mol % in the mixture of (2)+(3)];

(4) para-acetamidobenzoic acid: 14.32 g

[40 mol % relative to (1)];

(5) magnesium acetate: 0.051 g

[500 ppm].

The reaction was carried out as indicated in Example 1. A volume of 27 cm$^3$ of acetic acid was recovered (98.5% of theory). The polymer obtained was light grey and fibrous in appearance. It was insoluble in the solvent mixture employed for the viscosity measurements. The flow temperature was 290° C. The anisotropy region ranged from 300° C. to more than 350° C. The results of tensile, flexural and impact measurements are reported in the Table below.

EXAMPLE 4

The following materials were introduced into the same apparatus as that described in Example 1:
(1) chlorohydroquinone diacetate: 45.70 g

[molar ratio (1)/(2)+(3)=1];

(2) terephthalic acid: 16.6 g

[50 mol % in the mixture of (2)+(3)];

(3) 1,4-bis(para-carboxyphenoxy)butane: 33 g

[50mol % in the mixture of (2)+(3)];

(4) para-acetamidobenzoic acid: 17.9 g

[50 mol % relative to (1)];

(5) magnesium acetate: 0.0566 g

[500 ppm].

The reaction was carried out as indicated in Example 1. A volume of 28.3 cm$^3$ of acetic acid was recovered (98.9% of theory). The polymer obtained was light grey and fibrous in appearance. It had an inherent viscosity of 1.42 dl g$^{-1}$. The flow temperature was 280° C. The anisotropy region ranged from 300° C. to more than 360° C. The results of the tensile, flexural and impact measurements are reported in the Table below.

EXAMPLE 5

The following materials were introduced into the same apparatus as that described in Example 1:
(1) chlorohydroquinone diacetate: 45.70 g

[molar ratio (1)/(2)+(3)=1];

(2) terephthalic acid: 13.28 g

[40 mol % in the mixture of (2)+(3)];

(3) 1,4-bis(para-carboxyphenoxy)butane: 39.6 g

[60 mol % in the mixture of (2)+(3)];

(4) para-acetamidobenzoic acid: 21.48 g

[60 mol % relative to (1)];

(5) magnesium acetate: 0.060 g

[500 ppm].

The reaction was carried out as indicated in Example 1. A volume of 29.5 cm$^3$ of acetic acid was recovered (99% of theory). The polymer obtained was light grey and fibrous in appearance. It had an inherent viscosity of 1.10 dl g$^{-1}$. The flow temperature was 280° C. The anisotropy region ranged from 310° C. up to more than 370° C. The results of tensile, flexural and impact measurements are reported in the Table below.

EXAMPLE 6:

The following materials were introduced into the same apparatus as that described in Example 1:
(1) chlorohydroquinone diacetate: 45.70 g

[molar ratio (1)/(2)+(3)=1];

(2) terephthalic acid: 19.92 g

[60 mol % in the mixture of (2)+(3)];

(3) 1,4-bis(para-carboxyphenoxy)butane: 26.4 g

[40 mol % in the mixture of (2)+(3)];

(4) para-acetamidobenzoic acid: 14.32 g

[40 mol % relative to (1)];

(5) magnesium acetate: 0.0532 g

[500 ppm].

The reaction was carried out as indicated in Example 1. A volume of 27 cm³ of acetic acid was recovered of theory). The polymer obtained was light grey and fibrous in appearance. It had an inherent viscosity of 1.64 dl g⁻¹. The flow temperature was 270° C. The anisotropy region ranged from 290° C. to more than 360° C. The results of tensile, flexural and impact measurements are reported in the Table below.

EXAMPLE 7

The following materials were introduced into the same apparatus as that described in Example 1:

(1) chlorohydroquinone diacetate: 45.70 g

[molar ratio (1)/(2)+(3)=1];

(2) terephthalic acid: 19.92 g

[60 mol % in the mixture of (2)+(3)];

(3) 1,4-bis(para-carboxyphenoxy)butane: 26.4 g

[40 mol % in the mixture of (2)+(3)];

(4) para-acetamidobenzoic acid: 21.48 g

[60 mol % relative to (1)];

(5) magnesium acetate: 0.0568 g

[500 ppm].

The reaction was carried out as indicated in Example 1. A volume of 29 cm³ of acetic acid was recovered (97.6% of theory). The polymer obtained was light grey and fibrous in appearance. It was insoluble in the solvent mixture employed for viscosity measurements. The flow temperature was 28° C. The anisotropy region ranged from 310° C. to more than 380° C. The results of tensile, flexural and impact measurements are reported in the Table below.

EXAMPLE 8:

The following materials were introduced into the same apparatus as that described in Example 1:

(1) chlorohydroquinone diacetate: 45.70 g

[molar ratio (1)/(2)+(3)=1];

(2) terephthalic acid: 23.24 g

[70 mol % in the mixture of (2)+(3)];

(3) 1,4-bis(para-carboxyphenoxy)butane: 19.80 g

[30 mol % in the mixture of (2)+(3)];

(4) para-acetamidobenzoic acid: 14.32 g;

[40 mol % relative to (1)];

(5) magnesium acetate: 0.052 g

The reaction was carried out as indicated in Example 1. A volume of 27 cm³ of acetic acid was recovered (98.5% of theory). The polymer obtained was light grey and fibrous in appearance. It was insoluble in the solvent mixture employed for viscosity measurements. The flow temperature was 280° C. The anisotropy region ranged from 290° C. to more than 380° C. The results of tensile, flexural and impact measures are reported in the Table below.

TABLE

| EXAMPLE | TENSILE STRENGTH MPa | TENSILE MODULUS MPa | FLEXURAL MODULUS MPa | CHARPY IMPACT kJ/m² |
|---|---|---|---|---|
| 1 | 52 | 3,401 | 9,357 | 5 |
| 2 | 83 | 3,497 | 9,830 | 6.1 |
| 3 | 37.5 | 2,791 | 7,209 | 6.6 |
| 4 | 127 | 3,330 | 5,337 | 12.2 |
| 5 | 89 | 3,245 | 4,357 | 6.5 |
| 6 | 148 | 3,600 | 6,198 | 25.2 |
| 7 | 112 | 3,453 | 5,746 | 7.2 |
| 8 | 135 | 3,388 | 7,017 | 13.8 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A moldable/extrudable, high molecular weight thermotropic aromatic copolyesteramide comprising recurring structural units of the formulae (I), (II) and (IV), with or without (II), wherein:

(I) represents the structure:

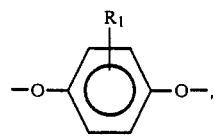

in which R₁ is a methyl or ethyl radical or a chlorine or bromine atom, with the proviso that the units (I) are identical or different, (II) represents the structure:

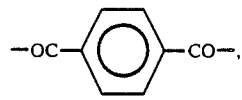

(III) represents the structure:

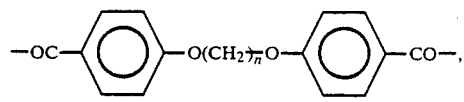

in which n is an integer ranging from 2 to 6, with the proviso that the units (III) are identical or different, (Iv) represents the structure:

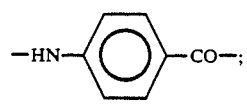

the molar ratio of the units (I) relative to the sum of the units (II)+(III) ranges from 0.95 to 1.05;

the amount of the units (II) in the mixture of (II)+(III) ranges from 0 to 80 mol % and that of the units (III), on the same basis, ranges from 100 to 20 mol %;

the amount of the units (IV), expressed relative to the amount of the units (I), ranges from 5 to 100 mol %; and said copolyesteramide having a flow temperature ranging from 200° to 350° C.

2. The thermotropic copolyesteramide as defined by claim 1, wherein the amount of the units (II) in the mixture of (II)+(III) ranges from 20 to 80 mol % and that of the units (III), on the same basis, ranges from 80 to 20 mol %, and the amount of the units (IV), expressed relative to the amount of the units (I), ranges from 10 to 70 mol %.

3. The thermotropic copolyesteramide as defined by claim 2, wherein the units (I) are identical and the substituent $R_1$ is a methyl radical or a chlorine atom; and the units (III) are also identical, with the symbol n being a number equal to 2, 3 or 4.

4. The thermotropic copolyesteramide as defined by claim 1, having a flow temperature ranging from 260° to 330° C.

5. The thermotropic copolyesteramide as defined by claim 1, further comprising recurring aromatic dioxy structural units, recurring aromatic dicarbonyl structural units, or recurring mixed aromatic secondary amine/carbonyl units having a structure other than that of the units (I), (II), (III) and (Iv), or mixtures thereof, the total amount of such additional structural units being not more than 10 mol % relative to the amount of the units (I).

6. The thermotropic copolyesteramide as defined by claim 5, said additional recurring structural units having the formulae:

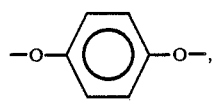

(I')

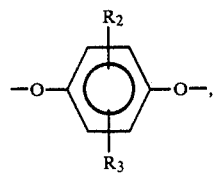

(I'')

in which $R_2$ and $R_3$, which are identical or different, each have the definition given for $R_1$, with the proviso that the units (I'') are identical or different,

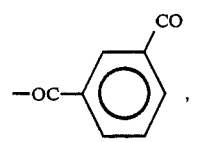

(II'')

or

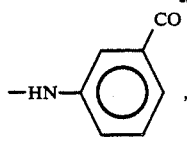

(IV')

or mixtures thereof.

7. A process for preparing a thermotropic copolyesteramide as defined by claim 1, comprising reacting:

(1) a diester of at least one of methyl-, ethyl-, chloro- or bromohydroquinone, optionally mixed with one or more diesters of another or of other diphenol(s), with (2) optionally, terephthalic acid or mixtures thereof with another aromatic dicarboxylic acid, with (3) one or more, α,ω-bis(paracarboxyphenoxy)alkane(s), and with (4) a derivative of para-aminobenzoic acid acylated on the amine group, or mixture thereof with an acylated derivative of such type of another aromatic amino acid, the said diphenol diester being prepared from an alkanoic acid containing from 2 to 6 carbon atoms and the said derivative of amino acid acylated on the amine group being prepared from an anhydride or halide derived from an alkanoic acid containing from 2 to 6 carbon atoms, the reactants being employed in proportions such that:

(i) the molar ratio diester(s) of diphenol(s)/ total diacids ranges from 0.95 to 1,05, (ii) the amount of terephthalic acid in the mixtures of terephthalic acid +α,ω-bix(para-carboxyphenoxy)alkane(s) ranges from 0 to 80 mol %, (iii) the amount of derivative of apra-aminobenzoic acid acylated on the amine group ranges from 5 to 100 mol % relative to the amount of diester(s) of monosubstituted hydroquinone(s), and (iv) the total amount of the reactants employed other than the diester(s) of monosubstituted hydroquinone(s), terephthalic acid, the α,ω-bis(-para-carboxyphenoxy)alkane(s) and the acylated derivative of para-aminobenzoic acid is not more than 10 mol % relative to the amount of diester(s) of monosubstituted hydroquinone(s).

8. The process as defined by claim 7, comprising reacting:

(1) as other diphenol(s), unsubstituted hydroquinone, or one or more hydroquinone(s) disubstituted with methyl, ethyl, chloro or bromo groups, or mixtures of said groups, or mixtures of unsubstituted hydroquinone and said one or more disubstituted hydroquinone, (2) as another aromatic dicarboxylic acid, isophthalic acid, and (4) as another aromatic amino acid, meta-aminobenzoic acid.

9. The thermotropic aromatic copolyesteramide as defined by claim 1, having an inherent viscosity of at least 0.5 dl g$^{-1}$.

10. The thermotropic aromatic copolyesteramide as defined by claim 9, having an inherent viscosity ranging from 0.5 to 4.0 dl g$^{-1}$.

11. A shaped article comprising a thermotropic aromatic copolyesteramide as defined by claim 1.

12. A shaped article by claim 11, comprising a fiber.

13. A shaped article as defined by claim 11, comprising a film.

14. A shaped article as defined by claim 11, comprising an extrudate.

15. A shaped article as defined by claim 11, comprising a molded substrate.

* * * * *